Jan. 12, 1971 E. KUHLE 3,554,850
LAMINATED FLOOR COVERING AND METHOD OF MAKING SAME
Filed Oct. 19, 1967

INVENTOR.
ERICH KUHLE
BY
ATTORNEYS

United States Patent Office 3,554,850
Patented Jan. 12, 1971

3,554,850
LAMINATED FLOOR COVERING AND METHOD OF MAKING SAME
Erich Kuhle, Schulstrasse 1515, Heerbrugg, Switzerland
Filed Oct. 19, 1967, Ser. No. 676,548
Claims priority, application Germany, Oct. 20, 1966,
K 60,502
Int. Cl. B32b 3/14
U.S. Cl. 161—38                                6 Claims

ABSTRACT OF THE DISCLOSURE

A flooring element is disclosed which comprises at least three layers; an upper layer which forms the floor surface, a lower layer which contacts the under floor and a middle layer; all layers being bonded by adhesives. Each of the lower and middle layers is composed of continuous strips which are parallel and spaced apart, preferably by a distance of two to three times the thickness of the element. The strips of the lowest and middle layers intersect at an angle of 90°. The various layers are generally similar in horizontal dimensions, and all layers but the lowest are superimposed. The lowest layer is diagonally offset to provide a projection on two sides which preferably has a width which is at least 5 to 8 times the element thickness. These elements may be assembled into a floor without the necessity of bonding to the floor by applying adhesive to the projections formed by the offset lower layer, laying a second element adjacent the first to cover the extension of the first and applying pressure to the superimposed portions, as by tapping with a hammer.

DISCLOSURE

Figure 1:
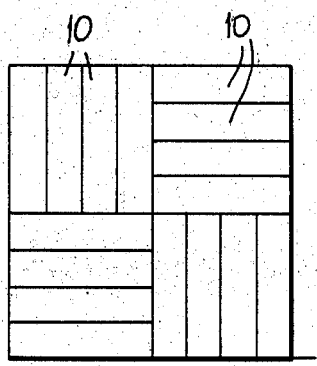

The invention concerns a floor covering consisting of at least three layers of thin and flexible frieze one above the other and fastened together by adhesives, the lowest being offset in relation to the other two which coincide, and rabbets being left free between the separate elements of the middle and lowest layers.

A floor covering of that kind is already known, which has, however, the disadvantage that the rabbets in the lowest layer run at right angles to the edge of the upper layers, with the result that no adequate coinciding with or covering of the rabbets of the middle layer is ensured when the sheets are placed together in the laying of the floor covering in the building. A further disadvantage of the known floor covering resides in the fact that the individual elements of the middle and the lowest layers are formed only partially as short strips which do not extend the full width, whereas other strips exhibit a square or rectangular shape, as a result of which no adequate lock effect is achieved, and also no adequate dimensional stability in a changeable climate or under damp conditions inside the building.

There is known, furthermore, a flooring element for parquet-type floors consisting of two layers of soft wood glued and locked together on to which is glued a hardwood walking surface, all the layers being locked in relation to one another by means of the boards of the middle layer which are displaced by something under 45° in relation to the grain of the walking surface and the supporting layer. Each board of that middle layer has, along each longer frontal side, a fixed spring protruding in relation to the walking layer and the supporting layer and along each of the other frontal sides a groove. In addition, edge straps are provided for the improvement of the locking effect. In this case the disadvantage already mentioned of low dimensional stability occurs to a still greater extent because no rabbets of a larger kind at all are provided between the separate elements of the under-layers, the result of that being that it is impossible to achieve any flexible property in the individual plates or sheets. In addition, the manufacture of the springs above mentioned, and also the separate finishing of the edge straps, is very expensive. Also, laying of the known floor elements without an overlapping toothed effect is not possible, which in turn excludes the possibility of factory sealing.

For the laying of the parquet plates or sheets known today, an adhesive is used which is painted on to the underfloor and into which the plates or sheets are laid. Thereupon a fairly long drying and setting period is necessary before the floor can be polished and sealed. For that reason it has hitherto been necessary to handle an adhesive on site and in addition to use further appliances such as sanding and sealing machines, all of which involves fairly heavy costs in the manual laying of the floor, as well as, always, the repeated observance of very troublesome drying periods.

The object of the present invention is to eliminate these disadvantages and in particular to create a floor of the kind mentioned above which makes possible, among other things, very rapid laying without drying periods.

For the attainment of that objective, according to the invention, the rabbets of the middle and the lowest layer intersect one another at an angle of 90°; the elements are, in a manner known per se, formed as strips; and those strips extend right through. By that means not only is the fully-operative sealing effect already mentioned achieved, which means also the maximum possible dimensional stability, but also at the same time simplicity of manufacture and laying is attained.

Wood, as is known, is liable to swell, and it alters its dimensions when dampness operates on it, and particularly when the floor is laid in new buildings which are still damp. Swelling and shrinkage are, however, avoided by locking.

A further development of the invention envisages that the width of the rabbets is two to three times as great as the thickness of the floor elements.

According to a further advantageous characteristic of the invention, the projecting parts of the layers are provided with an adhesive which is permanently adhesive. This, according to the invention, does not take place on site inside the building, but in the factory where the floor covering is made, so that the manipulation of adhesive in the building is entirely done away with.

By way of a further development of this concept, there is also provided, according to the invention, a process for the laying of the flooring of the invention in which the individual prefabricated plates or sheets are fastened to one another merely by pressure on the projecting parts already mentioned. At the same time, according to a further advantageous characteristic of the invention, the pressure in question can be applied by knocking with a hammer. Thus for the laying of the flooring according to the invention all that is necessary is a hammer and a saw for adapting the flooring to the size of the room, there being no need for any special measures for attachment to the under-floor. Further appliances such as a sanding machine, sealing agents and the like are no longer necessary in the building. When the floor layer has finished his work the room can be occupied immediately, since the most extensive dimensional stability and flexibility are offered.

According to the invention, connection to the underfloor is avoided, an effect which is called floating floor-laying. This makes an underlay of sound-, heat- or moisture-insulation possible. Furthermore, laying of the floor on under-floors which are not fully dried out is possible, which was out of the question previously. It is no longer necessary to observe any drying periods after the laying and the sealing.

The connection of the floor elements to one another over an extensive surface achieved by means of the pressing according to the invention gives an exactly-defined level for the upper edge of any given plate or sheet in relation to the upper edge of the neighbouring plate or sheet, and accordingly offers a ridge-free and rabbet-free connection which is independent of unevennesses in the under-floor.

The invention also envisages a process for the manufacture of the floor covering according to the invention. According to that process, after the two upper layers have been stuck together, the plate so formed is processed and sanded to the exact thickness required, after which the edges are dressed and the surface is sealed. The intermediate product thus obtained is stuck on to the underlayer, the projecting parts already mentioned forming a projection of thickness at least five to eight times the total thickness of the plates. The adhesive already mentioned is applied over the whole surface of every plate so that an additional application of adhesive to the projecting parts in a separate operation is not necessary. This adhesive is very long-lasting and can be used even after being kept for a long time at the building site, the pressure, as already mentioned, being simply applied from above. By this method according to the invention, the plate is pre-finished in such a way that the extremely simple laying of the floor on site as already mentioned can be carried out without anyone having to put up with any disadvantages.

According to a further advantageous characteristic of the invention, when the adhesive is applied as described, the frontal edges of the individual elements are not coated with adhesive. According to the invention it is not at all necessary that any binding force should be applied transversely to the plane of the plate within a layer, because, as a result of the arrangement, according to the invention, whereby the rabbets intersect one another at right angles, the stability of the sheets or plates is fully adequate.

The covering layer of the flooring according to the invention can consist of cut, pared or sawn veneers known per se, while one or more of the lower layers can be made from veneers or of plates made of wood chips or fibre, of plastic or of inorganic materials. For example, it is advantageous to make the middle and the bottom layers of asbestos cement. These materials are particularly economical and damp-resistant, and the invention makes possible a combination with the covering layer mentioned out of wood.

Other advantages and details of the invention emerge from the following description, with reference to the drawings, of an example of embodiment of the invention.

Figure 2:
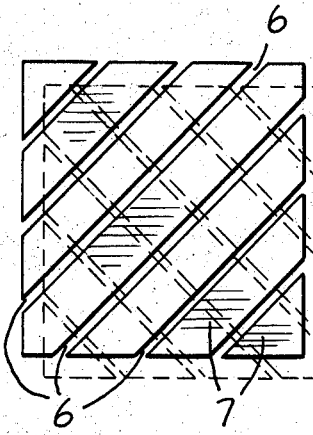
Figure 3:
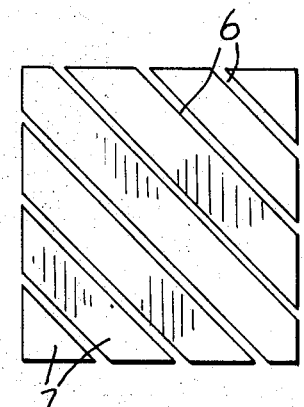
Figure 4:
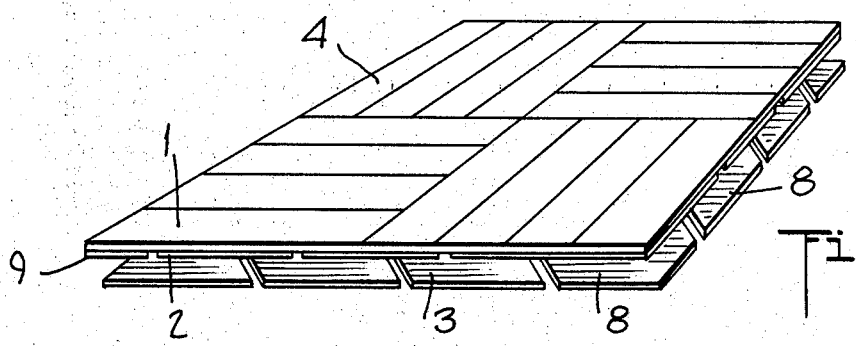
Figure 5:
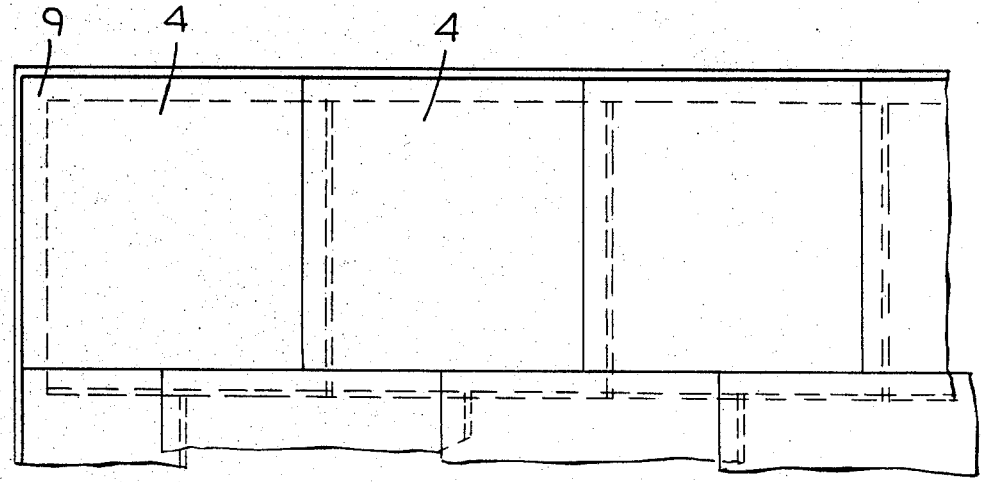

FIG. 1 is a plan view of the covering layer;
FIG. 2 is a plan view of the middle layer;
FIG. 3 is a plan view of the underlayer;
FIG. 4 is a perspective view of the finished sheet or plate in perspective; and
FIG. 5 is a plan view of the floor covering according to the invention.

In the covering layer shown in FIG. 1 all the edges of the parts 10 ranged hard up against one another are orientated parallel to the rims of the plate or sheet. By that means is obtained the external appearance of a sheet of parquet. In fact the floor according to the invention is not distinguishable in its aesthetic effect from a conventional parquet floor.

The covering layer 1 can, as already explained, be made of cut, pared or sawn veneers. On the other hand, the layers 2 and 3 can be made out of wood chips or fibre plates; but they can also be of plastic or inorganic materials such as asbestos cement.

The middle layer illustrated in FIG. 2 consists of continuous strips 7, between which the rabbets 6, two to three times the thickness of a layer, are left free. The edges of these strips 7, which according to the invention are continuous, run diagonally to the rims of the covering layer.

FIG. 3 shows the lowest layer with similar strips 7 and rabbets 6, which likewise run diagonally to the edges of the covering layer 1, but intersect at right angles, according to the invention, the rabbets of the middle layer.

As FIG. 4 shows, the lowest layer 3 already mentioned is in manner known per se offset in relation to the two upper layers 1 and 2 which coincide with one another, so that projecting parts 8 and 9 result which serve for the sticking together of the individual plates. In FIG. 5 the projecting edges or parts 9 mentioned can be seen particularly clearly, as the dotted lines illustrate the edges of the lowest layer 3 lying beneath them. As can there be seen, a fairly large number of these separate prefabricated plates or sheets 4 are stuck together to form a floor covering.

For sticking the plates together an adhesive is used which is applied at the factory over the whole surface of the plate and then dried, and which after storage, for a fairly long time, is still capable of sticking if both parts to be fastened to one another are covered with the already-dried adhesive.

Thereafter the projecting parts 8 and 9 already mentioned are also coated with the permanently adhesive glue, and a firm and immediately-effective connection of the separate plates 4 can very easily be achieved when the plates, having been put together in the manner shown in FIG. 5, are placed under pressure against one another by means of the projecting parts 8 and 9. For this purpose tapping with a suitable hammer is sufficient. Thus the floor covering according to the invention is not connected to the underfloor, this being an example of the so-called floating application. The result is that it is easy to lay the floor covering according to the invention on to insulating sheeting or the like, in which case minor unevennesses in the under-floor are hardly to be taken into account. No particular demands by way of firmness are made of the underfloor as is the case, for example, with known glued mosaic-parquet plates.

Manufacture of the floor covering according to the invention is effected in the following manner. First of all, the two layers 1 and 2 are glued together. This intermediate product is then processed and sanded down to exact thickness. Thereupon the edges of the plate thus formed are trimmed and the surface is sealed. The underside of the plate so formed is then, together with the strips 7 of the underlayer 3 to be formed, coated with the glue, and the two are glued together in the offset manner illustrated in FIGS. 4 and 5. The degree of offset of the projecting parts 8 and 9 amounts to about five and eight times the total layer thickness, so that a fastening resistant to bending results.

The frontal edges of the individual strips of the underlayer 3 are not coated with glue in advance, which results in a considerable simplification of the operation. The middle layer 2 and the lower layer 3 are preferably made the same thickness as the covering layer 1, and preferably relatively thin at that, about 2 to 3 mm., in order that a floor covering flexible in general effect may be obtained.

The plates 4 themselves can have a rectangular contour as illustrated, but any other desired contour is feasible. In particular, it is possible to saw the plates up as desired for the purpose of fitting them against the walls of a room. The edges of the plates are preferably straight, but they can be serrated, for example if it is desired to produce a so-called herring-bone pattern.

All the details described and illustrated are of significance for this invention.

Having now in detail described and ascertained my said invention and the manner in which the same is to be performed, I declare that what I claim is:

1. A laminated floor covering including at least three layers, each of said layers being composed of thin flat strips, the strips of the topmost layer of said floor covering abutting each other to provide a substantially solid layer, the strips of the bottom and middle layers of said floor covering being composed of spaced, generally parallel strips separated by rabbets, with the strips of said bottom layer being at an angle of about 90° to the strips of said middle layer, said upper and middle layers having the same lateral dimensions and being superimposed, and said lower layer having the same lateral dimensions as the upper and middle layers, but being offset in relation thereto.

2. A floor covering according to claim 1 wherein the strips forming at least one of the lower and middle layers are made of wood-chip board, fiber board or asbestos cement board.

3. A floor covering according to claim 1 wherein the width of the space between the strips forming the middle and bottom layers is 2 to 3 times the thickness of said layers.

4. A method for producing a floor covering comprising the steps of forming a first layer of laterally abutting thin flat strips, adhesively bonding to one surface of said first layer thin flat strips to form a second layer of spaced, generally parallel strips separated by rabbets adhesively bonded to said first layer, said first and second layers having the same lateral dimensions and being superimposed and forming a plate, and thereafter adhesively bonding to the exposed surface of said second layer thin flat strips to form a third layer of spaced, generally parallel strips separated by rabbets at an angle of about 90° to the strips of said second layer, said third layer having the same lateral dimensions as said first and second layers but being offset in relation thereto.

5. A method according to claim 4 wherein said plate is processed and sanded to the thickness required, the edges thereof are dressed, and the surface thereof is sealed before being adhesively bonded to said third layer.

6. A method according to claim 4 wherein the strips from the first layer are made of wood veneer, and at least one of the other layers is veneer, wood-chip board, fiber board or asbestos board.

References Cited

UNITED STATES PATENTS

| | | | |
|---|---|---|---|
| 2,590,032 | 3/1952 | Petry | 161—38X |
| 3,279,138 | 10/1966 | Dittmar | 161—56X |
| 2,835,936 | 5/1958 | Elmendorf | 161—56X |

FOREIGN PATENTS

| | | | |
|---|---|---|---|
| 258,794 | 5/1949 | Switzerland | 52—390 |

PHILIP DIER, Primary Examiner

U.S. Cl. X.R.

52—313, 390, 592; 156—297; 161—55